(12) United States Patent
Johnson et al.

(10) Patent No.: US 8,146,091 B2
(45) Date of Patent: Mar. 27, 2012

(54) EXPANSION AND CONTRACTION OF LOGICAL PARTITIONS ON VIRTUALIZED HARDWARE

(75) Inventors: Chris D. Johnson, Rochester, MN (US); Kristi Paula Peterson, Rochester, MN (US); John Joseph Stecher, Rochester, MN (US); Matthew Ryan Weaver, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 991 days.

(21) Appl. No.: 12/113,272

(22) Filed: May 1, 2008

(65) Prior Publication Data

US 2009/0276783 A1 Nov. 5, 2009

(51) Int. Cl.
*G06F 9/46* (2006.01)

(52) U.S. Cl. ........................................ 718/104
(58) Field of Classification Search .................. None
See application file for complete search history.

(56) References Cited

U.S. PATENT DOCUMENTS

| | | | |
|---|---|---|---|
| 2003/0065835 A1* | 4/2003 | Maergner et al. | 710/61 |
| 2004/0212511 A1* | 10/2004 | Ahrens et al. | 340/635 |
| 2005/0027668 A1* | 2/2005 | Foster et al. | 707/1 |
| 2006/0136695 A1* | 6/2006 | Vaupel | 711/173 |
| 2006/0259730 A1* | 11/2006 | Gimpl et al. | 711/173 |
| 2007/0124274 A1* | 5/2007 | Barsness et al. | 707/2 |
| 2007/0162720 A1* | 7/2007 | Branda et al. | 711/173 |
| 2008/0022278 A1* | 1/2008 | Gschwind et al. | 718/100 |
| 2008/0071755 A1* | 3/2008 | Barsness et al. | 707/4 |
| 2008/0244215 A1* | 10/2008 | Flemming et al. | 711/173 |
| 2009/0055830 A1* | 2/2009 | Gusler et al. | 718/104 |
| 2009/0118839 A1* | 5/2009 | Accapadi et al. | 700/28 |
| 2009/0150640 A1* | 6/2009 | Royer et al. | 711/173 |

* cited by examiner

*Primary Examiner* — Idriss N Alrobaye
(74) *Attorney, Agent, or Firm* — Wood, Herron, & Evans LLP

(57) ABSTRACT

A method, apparatus, and program product manage a plurality of resources of at least one logically partitioned computing system of the type that includes a plurality of logical partitions managed by a partition manager with an application level administrative console resident in a logical partition of the computing system. Each logical partition is allocated at least a portion of the plurality of resources. A user request to adjust the allocation of at least a portion of the resources using the administrative console is received. The resources of the logically partitioned computing system to adjust in order to satisfy the user request are determined using the application level administrative console. The application level administrative console accesses the partition manager through a resource allocation interface to adjust the determined resources of the logically partitioned computing system in order to satisfy the user request.

19 Claims, 4 Drawing Sheets

EXPANSION AND CONTRACTION OF LOGICAL PARTITIONS ON VIRTUALIZED HARDWARE

FIELD OF THE INVENTION

The present invention relates to computing systems, and more particularly to logically partitioned computers and the allocation of resources therein.

BACKGROUND OF THE INVENTION

Modern requirements for a computer system may require that a computer be utilized to run several operating environments at once. In a typical embodiment, a single logically partitioned computer can run a plurality of operating environments in a corresponding plurality of logical partitions. Each operating environment, or operating system, resides in its own logical partition, with each logical partition allocated a part of a processor, an entire processor, or multiple processors of the computer. Additionally, a portion of the computer's memory is allocated to each logical partition. From the perspective of each operating system, therefore, the operating system operates as if it were running on a separate physical machine having the processor and memory resources to which the logical partition has been allocated.

All of the logical partitions in the computer are under the control of a partition manager. The partition manager is typically a part of the computer firmware and manages the allocation of resources to the operating environments and logical partitions.

Logical partitions on the computer are typically configured by an Information Technology ("IT") professional that has authority to access the partition manager and configure each logical partition. Logical partitions may also be configured by the manufacturer of the computer. In a typical configuration, the resources of the computer (i.e., processors, memory, use of I/O devices) are spread evenly amongst each logical partition. For example, if the computer has eight processors with four processor cores (i.e., the computer is a 32-way system), the computer may be configured with sixteen logical partitions utilizing two processor cores each. In this way, an operating system configured on a logical partition views the logical partition as a two-way computer system (i.e., each computer system having two processors). Similarly, the computer may be configured with eight logical partitions utilizing one processor (i.e., the logical partition utilizes four processor cores). In this way, an operating system configured on the logical partition views the logical partition as a four-way computer (i.e., a computer having four processors).

The logical partitions configured on many conventional logically partitioned computers generally remain static after configuration. However, this configuration often results in an inefficient use of the resources in the computer. The needs of an operating environment (or software running on the operating environment) typically vary over time. As such, the operating environment often struggles to conform to the configured logical partitions. In the end, the user(s) is typically forced to "shoehorn" data processing into an inadequate logical partition that does not meet resource needs and whose configuration cannot be changed. The operating environment, or applications thereon, configured on that inadequate logical partition is typically starved for resources while other resources in the computer may be unused or underutilized. An operating environment starved for resources is typically associated with a loss of productivity and/or efficiency.

Adjusting the resources allocated to the logical partitions on a logically partitioned computer is often time consuming and laborious. In conventional logical partitioned computers, the partition manager must be accessed directly by the IT professional to adjust the resource allocation to the logical partitions. As such, a user who uses the logically partitioned computer and/or the logical partitions (each of which may be configured with multiple copies of the same software) typically does not have access to the partition manager of the computer. Therefore, adjusting the configuration of the logically partitioned computer (which typically includes adjusting the resources to one or more logical partitions) often requires the user to contact the IT professional, who generally must be physically present at the logically partitioned computer to log into the partition manager and adjust the resources of the logical partitions on the computer. This solution is ungainly and time consuming, especially when the IT professional is located at a remote location from the logically partitioned computer. Additionally, contacting the IT professional often involves significant expense and entails administrative headaches for the user of computer who must wait for the IT professional to adjust the resources to the logical partitions. Compounding these expenses and headaches, the need for adjusting the logical partitions on the computer is typically abated by the time the IT professional arrives, rendering the entire exercise moot.

Adjusting the resources of a logically partitioned computer frequently entails other difficulties because conventional adjustment of the partition resources requires halting all data processing on the logical partitions, reconfiguring all the logical partitions with new resources (including configuring any new logical partitions or removing any old logical partitions), migrating operating environments to new logical partitions (if any), migrating operating environments from logical partitions to be removed (if any), restarting each logical partition, and reconfiguring logical partitions that are part of distributed computing environments back into their distributed computing environments. All these steps are typically performed by the IT professional who may not have any idea about the future processing requirements of the logically partitioned computer. In addition, it may be desired to perform these steps more than once per day. However, it is generally impossible for the IT professional to adjust the resources of the logically partitioned computer in this way multiple times per day. The adjustments to the logical partitions often take critical amounts of time and seriously impact the use of the logically partitioned computer during a downtime associated with the logical partition adjustments. Because data processing is halted, and because the logical partitions cannot be started until all data is migrated to all new logical partitions, this downtime can become severe and leave businesses and/or their customers offline for unacceptable amounts of time.

Consequently, there is a continuing need for improving the adjustment of logical partition resources in a logically partitioned computer so as to minimize the complexity and downtime associated with reallocating resources among the logical partitions.

BRIEF SUMMARY OF THE INVENTION

Embodiments of the invention provide for managing the resources in a logically partitioned computing system with an application level administrative console. The administrative console may include a resource allocation interface to interact with the partition manager and adjust the resources, and in some embodiments, may also include a scripting interface and a graphical user interface (GUI) that are operable to receive input from a user. The user of the administrative console may be a user that does not ordinarily have access to the partition manager. As such, the administrative console may provide the user with tools to adjust the resources dynamically through a programming interface operable to accept scripts to adjust resources, through the GUI, or through command prompts. The application may also be implemented as a distributed application that can be used to connect Web site users with other applications, programs, processes, or data.

In accordance with some embodiments of the invention, the management process receives a user request to adjust the allocation of at least a portion of the plurality of resources using an application level administrative console resident within a logical partition in the logically partitioned computing system. The application level administrative console determines the resources of the logically partitioned computing system to adjust in order to satisfy the user request. The application level administrative console is utilized to access a resource allocation interface of the partition manager to adjust the resources of the logically partitioned computing system in order to satisfy the user request.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION

Figure 1:
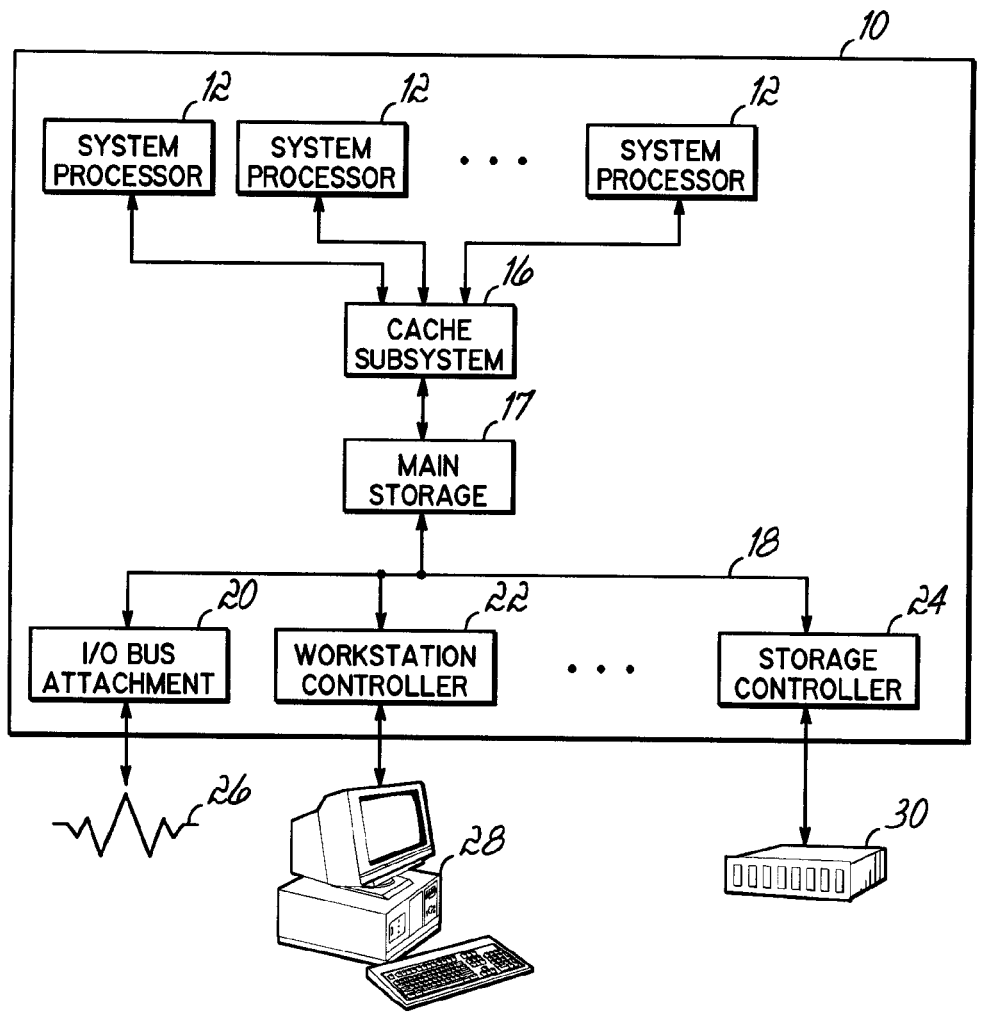
FIG. 1 is a diagrammatic illustration of a computer system configured to accomplish local logical partition adjustment consistent with principles of the invention.

Features of the present invention include a method, apparatus, and program product for dynamically managing resources of at least one logically partitioned computing system. In general, logical partitions of the computing system are managed by a partition manager ("hypervisor"). As such, the logical partitions may run in a virtualized environment separate from the physical hardware underneath.

In one embodiment, there is a provided a method of managing a plurality of resources of the logically partitioned computing system of the type that includes a plurality of logical partitions. The logical partitions are managed by the hypervisor and allocated at least a portion of the plurality of resources. The method comprises receiving a user request to adjust the allocation of at least a portion of the plurality of resources using an application level administrative console that is resident within a logical partition in the logically partitioned computing system. The application level administrative console determines the resources of the logically partitioned computing system to adjust in order to satisfy the user request. The application level administrative console may be then utilized to access the hypervisor through a resource allocation interface of the hypervisor to adjust the determined resources of the logically partitioned computing system in order to satisfy the user request.

In one embodiment, virtual resources are allocated to each logical partition such that the virtual resources appear to a logical partition to which they are allocated as actual physical resources. Each virtual resource accesses at least a portion of an actual physical resource to perform an action, complete a task, or otherwise aid the logical partition. Resources include, but are not limited to, processor cycles, memory, I/O devices, components of the logically partitioned computing device, components connected to the logically partitioned computing device, and/or components in communication with the logically partitioned computing device. In one embodiment, resources that are not allocated to the plurality of logical partitions are maintained in a resource pool.

In one embodiment, where the user request is for the creation of a new logical partition, a method consistent with the invention identifies a logical partition profile to configure on the new logical partition, allocates at least a portion of the resources in the resource pool to the new logical partition, and migrates data from the logical partition profile to the new logical partition. The new logical partition may be configured as a member of a distributed computing environment. In another embodiment, at least a portion of the resources from the resource pool is allocated to at least one logical partition.

The administrative console is operable to interact with a resource allocation interface of a hypervisor. The resource allocation interface, in turn, is operable to allocate and adjust the resources of the logically partitioned computing system. In one embodiment, the administrative console is a separate application resident in a logical partition from among the plurality of logical partitions of the logically partitioned computing system that can be accessed by the user to adjust the resources allocated to at least one other logical partition configured on that logically partitioned computing system. In another embodiment, the administrative console is a component of an application configured on the logically partitioned computing system that can be accessed by the user to adjust the resources allocated to at least one logical partition configured on that logically partitioned computing system. In another embodiment, the administrative console is a component of an application configured across one or more logical partitions configured as members of a distributed computing environment that can be accessed by the user to adjust the resources allocated to the distributed computing environment.

Hardware and Software Environment

Turning more particularly to the drawings, wherein like numbers denote like parts throughout the several views, FIG. 1 generally illustrates a data processing apparatus 10 consistent with the invention. Apparatus 10, in specific embodiments, may be a computer, computer system, computing device, server, disk array, or programmable device such as a multi-user computer, a single-user computer, a handheld device, a networked device (including a computer in a cluster configuration), a mobile phone, a video game console (or other gaming system), etc. Apparatus 10 may be referred to as "logically partitioned computing system" or "computing system," but will be referred to as "computer" for the sake of brevity. One suitable implementation of computer 10 may be a multi-user computer, such as a computer available from International Business Machines Corporation.

Computer 10 generally includes one or more physical processors ("processors") 12 coupled to a memory subsystem including main storage 17, e.g., an array of random access memory (RAM). Main storage 17 may be comprised of dynamic random access memory (DRAM), static random access memory (SRAM), flash memory, hard disk drive, and/or another digital storage medium. Where desired, the processors 12 may be multithreaded and/or have multiple cores. Also illustrated as interposed between processors 12 and main storage 17 is a cache subsystem 16, typically including one or more levels of data, instruction and/or combination caches, with certain caches either serving individual processors or multiple processors as is well known in the art.

Furthermore, main storage 17 may be coupled to a number of external (I/O) devices via a system bus 18 and a plurality of interface devices, e.g., an input/output bus attachment interface 20, a workstation controller 22, and/or a storage controller 24, which respectively provide external access to one or more external networks 26, one or more workstations 28, and/or one or more storage devices such as a direct access storage device (DASD) 30. System bus 18 may also be coupled to a user input (not shown) operable by a user of computer 10 to enter data (i.e., the user input may include a mouse, a keyboard, etc.) and a display (not shown) operable to display data from the computer 10 (i.e., the display may be a CRT monitor, an LCD display panel, etc.). Computer 10 may also be configured as a member of a distributed computing environment and communicate with other members of that distributed computing environment through network 26.

Figure 2:
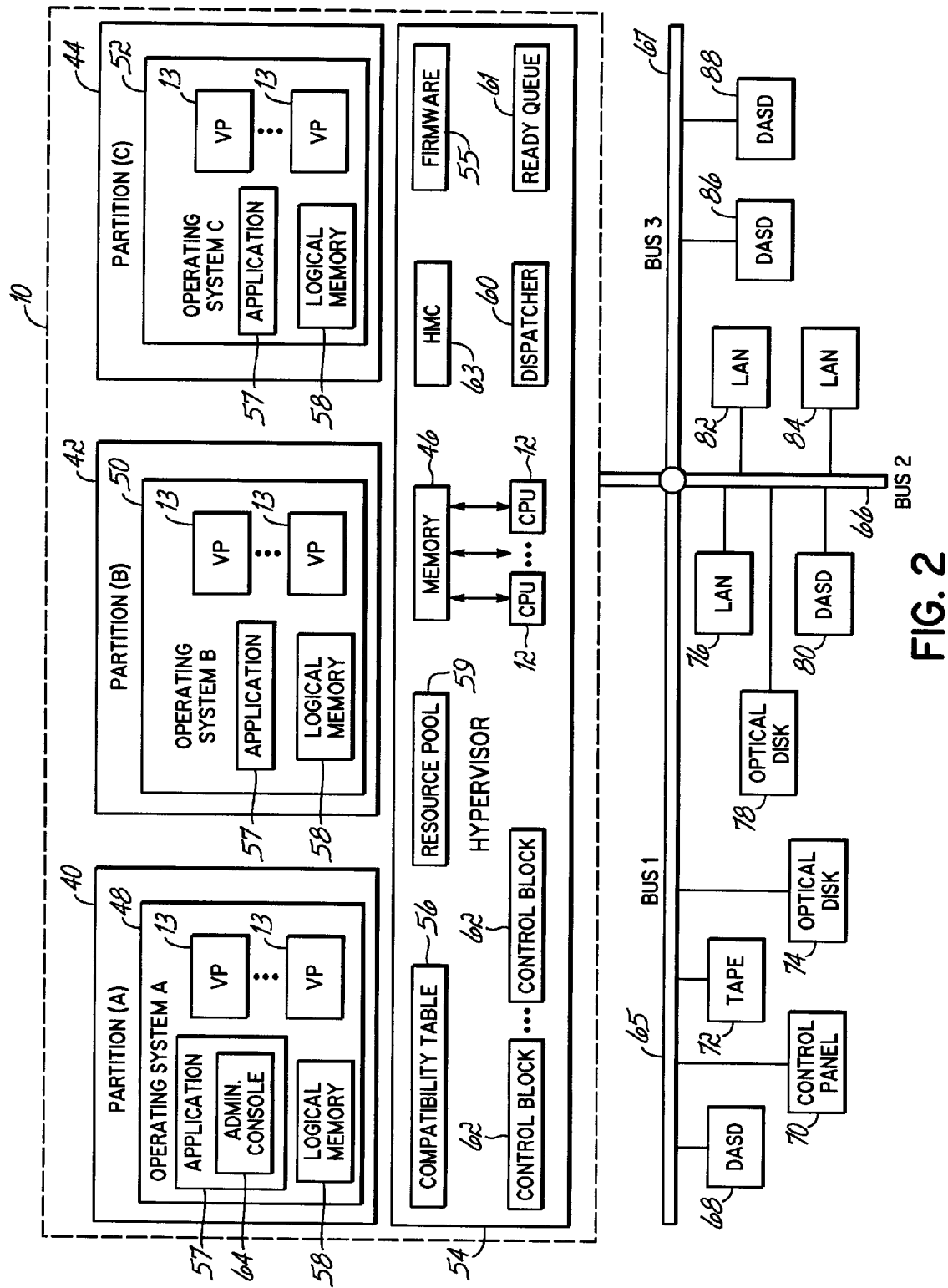
FIG. 2 is a diagrammatic illustration of the primary software components and resources of the computer system of FIG. 1.

FIG. 2 illustrates in greater detail the primary software components and resources used to implement a logically partitioned environment consistent with embodiments of the invention. FIG. 2 generally shows a logically partitioned computing system characterized as a virtual machine design, as developed by IBM. In particular, FIG. 2 may illustrate an architecture of one of the embodiments of the computer 10. The computer 10 includes a plurality of partitions, e.g., partitions 40, 42 and 44, that share common processing resources. The logically partitioned computing system architecture may rely upon a single computing machine having one or more processors 12, or central processing units (as shown in FIG. 2, each processor 12 is designated "CPU"), coupled with a system memory 46. The system memory 46 may be incorporated into the main storage 17 or DASD 30 shown in FIG. 1, or a separate memory. Referring back to FIG. 2, the processors 12 may execute software configured to simulate one or more virtual processors 13 in each partition 40, 42, 44.

The partitions 40, 42, 44 may logically comprise a portion of computer's processors 12, memory 46, and/or other resources. Each partition 40, 42 and 44 typically hosts an operating environment or operating system 48, 50, 52 (respectively). After being configured with resources and operating systems 48, 50, 52, each partition 40, 42, 44 operates largely as if it is a separate computer.

An underlying program, called a partition manager, or "hypervisor" 54, may be operable to assign and adjust resources to each partition 40, 42, 44. For instance, the hypervisor 54 may intercept requests for resources from operating systems 48, 50, 52 or applications configured thereon in order to globally share and allocate the resources of computer 10. For example, when the partitions 40, 42, 44 within computer 10 are sharing processors 12, the hypervisor 54 allocates physical processor cycles between the virtual processors 13 of the partitions 40, 42, 44 sharing the processors 12. The hypervisor 54 may also share other resources of computer 10. Other resources of computer 10 that may be shared include the memory 46, other components of the computer 10, other devices connected to the computer 10, and other devices in communication with computer 10. The hypervisor 54 may include its own firmware 55 and compatibility table 56. Moreover, for purposes of this specification, the partitions 40, 42 and 44 may use either or both the firmware of the partition and hypervisor.

The hypervisor 54 creates, adds, or adjusts resources utilized by the logical partitions 40, 42, 44 by adding or removing virtual resources from one or more virtual resources of the partitions 40, 42 and 44. For example, the hypervisor 54 controls the visibility of the physical processors 12 to each partition 40, 42 and 44, aligning the visibility of the one or more virtual processors 13 to act as customized processors (i.e., the one or more virtual processors 13 may be configured with a different amount of resources than the physical processors 12). Similarly, the hypervisor 54 may create, add, or adjust other virtual resources that align the visibility of other physical resources of computer 10.

Each operating system 48, 50 and 52 controls the primary operations of its respective logical partition 40, 42 and 44 in a manner similar to the operating system of a non-partitioned computer. For example, each logical partition 40, 42 and 44 may be members of the same, or a different, distributed computing environment. As illustrated in FIG. 2, each operating system 48, 50, and 52 includes application 57. In one embodiment, application 57 is a "middleware" application that connects applications, processes, and/or software components. In the illustrated embodiment, application 57 may consist of a set of enabling services that allow multiple processes running on one or more logical partitions of one or more computers to interact. As such, application 57 may be a distributed application configured across multiple logical partitions (i.e., as shown in FIG. 2, across logical partitions 40, 42 and 44) of one or more computers (i.e., as shown in FIG. 2, application is configured across computer 10) as part of a distributed computing environment. One such distributed computing environment is a WebSphere architecture, as developed by International Business Machines Corporation ("IBM") of Armonk, N.Y., such that a business may set up, operate, and integrate network-based websites, applications, or businesses across one or more computing systems.

Each operating system 48, 50 and 52 may execute in a separate memory space, represented by logical memory 58. Each logical partition 40, 42, and 44 may be statically and/or dynamically allocated a portion of the available resources in the computer 10. For example and as discussed herein, each logical partition 40, 42 and 44 may share the processors 12 by sharing a percentage of processor resources as well as a portion of the available memory 46 for use in logical memory 58. In this manner, the resources of a given processor 12 may be utilized by more than one logical partition. In similar manners, the other resources available to computer 10 may be utilized by more than one logical partition.

When resources of the computer 10 are not being utilized, the hypervisor 54 may track the free resources in one or more resource pools 59. The pool 59 may include a list of resources of the computer 10 (i.e., CPU's 12, memory 46, etc.) that are available for performing a task, available for processing data, available for access, or otherwise available to be allocated to the logical partitions 40, 42, and 44.

The hypervisor 54 may include a dispatcher 60 that manages the dispatching of virtual resources to physical resources on a dispatch list, or ready queue 61. The ready queue 61 comprises memory that includes a list of virtual resources having work that is waiting to be dispatched to a resource of computer 10. As shown in FIG. 2, the hypervisor 54 includes processors 12 and processor control blocks 62. The processor control blocks 62 interface with the ready queue 61 and comprise memory that includes a list of virtual processors 13 waiting for access on a respective processor 12. Although FIG. 2 illustrates at least one processor control block 62 for each processor 12, one skilled in the art will appreciate that the hypervisor 54 may be configured with more or less processor control blocks 62 than there are processors 12.

The hypervisor 54 may include a resource allocation interface, or "hardware management console" ("HMC") 63, operable to allocate resources to the logical partitions 40, 42, 44. The HMC 63 is an interface local to the hypervisor 54 that provides access to allocate resources of the computer 10 and also tracks the resource utilization of the computer 10 by analyzing the resource pool 59, dispatcher 60, ready queue 61, and control blocks 62. As such, the HMC 63 is operable to determine the exact resource utilization of the computer 10 and each logical partition 40, 42, 44.

Each operating system 48, 50, and 52 is configured with application 57. One or more configurations of application 57 (as illustrated in FIG. 2, the application 57 configured on operating system 48) may be further configured with an application level administrative console, or "administrative console" 64, operable to interface with the hypervisor 54 of computer 10. The administrative console 64 is also configured to interface with the hypervisor 54 of at least one other logically partitioned computer that includes a logical partition that is configured as a member of the same distributed computing environment as logical partition 48 (i.e., a "DCE computer"). The administrative console 64 is further operable to interface with the hypervisor 64 to determine the resource utilization of the computer 10 and/or at least one DCE computer. In particular, the administrative console 64 may interface with the HMC 63 of a hypervisor 54 to view or adjust resources. One having ordinary skill in the art will realize that the administrative console 64 may be separate from application 57 and configured directly on an operating system 48, 50, and 52. In this way, the administrative console 64 may act substantially as a stand-alone application.

The user may use the administrative console 64 to dynamically adjust the resources of computer 10 in response to a condition, start one or more new logical partitions and load them with an appropriate software, and/or adjust the resource allocation of computer 10. Similarly, the user may use the administrative console 64 to perform those same tasks on the at least one DCE computer. As such, the user is able to view and adjust resources of the computer 10 and/or the at least one DCE computer through the administrative console 64 without having to contact an IT professional.

Referring back to FIG. 2, additional resources, e.g., mass storage, backup storage, user input, network connections, and the like, are typically allocated to the partitions 40, 42, 44 in a manner well known in the art. Resources can be allocated in a number of manners, e.g., on a bus-by-bus basis, or on a resource-by-resource basis, with multiple logical partitions sharing resources on the same bus. Some resources may even be allocated to multiple logical partitions at a time. FIG. 2 illustrates, for example, three logical buses 65, 66 and 67, with a plurality of resources on bus 65, including a direct access storage device (DASD) 68, a control panel 70, a tape drive 72 and an optical disk drive 74, allocated to a partition.

Bus 66, on the other hand, may have resources allocated on a resource-by-resource basis, e.g., with local area network (LAN) adaptor 76, optical disk drive 78 and DASD 80 allocated to logical partition 40, and LAN adaptors 82 and 84 allocated to logical partition 42. Bus 67 may represent, for example, a bus allocated specifically to logical partition 42, such that all resources on the bus, e.g., DASD's 86 and 88, are allocated to the same logical partition.

Figure 3:
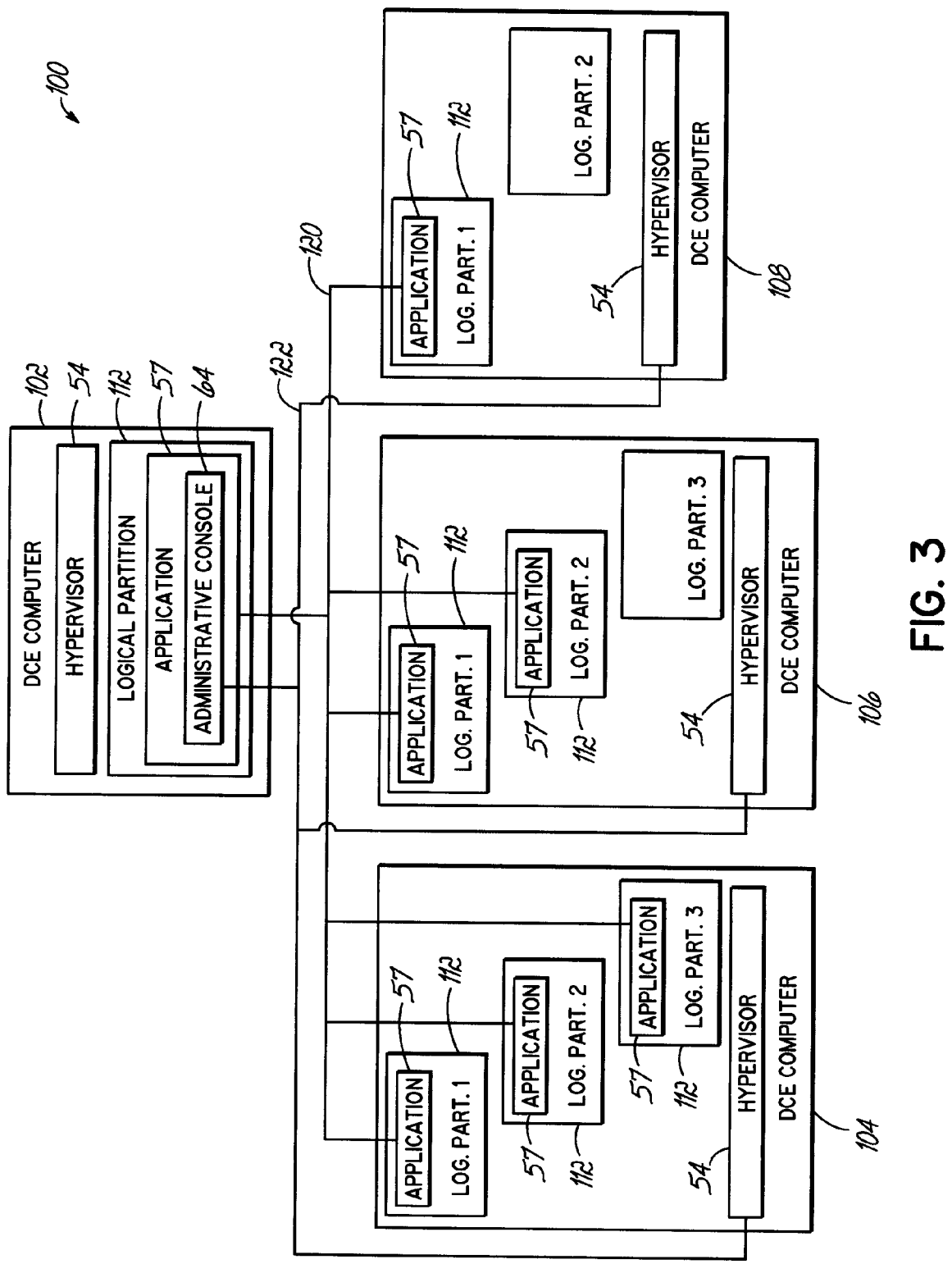
FIG. 3 is a simplified schematic illustration of a distributed computing environment configured with at least one computer system of FIGS. 1 and 2.

FIG. 3 is a simplified illustration of a distributed computing environment ("DCE") 100 consistent with embodiments of the invention. The distributed computing environment 100 may include at least one DCE computer (in FIG. 3, there are four DCE computers shown, 102, 104, 106, and 108 respectively) that each includes at least one logical partition that is configured as a member 112 of the DCE 100. As illustrated in FIG. 3, each DCE computer 102-108 may be embodiments of computer 10 illustrated in FIGS. 1 and 2, and include at least one logical partition and a partition manager, or "hypervisor" 54. At least one logical partition of each DCE computer 102-108 may be configured with application 57. DCE computer 102 is further configured with the administrative console 64.

The configurations of application 57 may be in communication with each other by way of a communication link 120. The communication link 120 may be through the network 26 by way of I/O bus attachments 20 configured on each computer 102-108, or another communication method well known in the art. Similarly, the administrative console 64 is in communication with each hypervisor 54 by way of a communication link 122, which may also be through the network 26 by way of I/O bus attachments 20 configured on each computer 102-108, or another communication as is well known in the art. Though not shown, the administrative console 64 may be in communication with each hypervisor 54 through the one or more members 112 of DCE computers 104-108. It will be appreciated by one having ordinary skill in the art that administrative console 64 can interface with the hypervisor 54 of DCE computer 102 directly. Thus, in one embodiment consistent with the present invention, the administrative console 64 is operable to interface with the hypervisors 54 of DCE computers 102-108 to view and manage the resources of each DCE computer 102-108 in the distributed computing environment 100. For example, the administrative console may interface with the hypervisor 54 of DCE computer 104 to remove resources from one or more of the members 112 of the distributed computing environment 100. Additionally, the administrative console 64 may interface with the hypervisor 54 of DCE computer 106 to remove resources from the logical partition that is not a member 112 of the distributed computing environment 100 (i.e., "Log. Part. 3" of DCE computer 106) and reallocate those resources to one of the members 112 of the distributed computing environment 100 (i.e., "Log. Part. 1" and "Log. Part. 2" of DCE computer 106) or a new logical partition on computer 106. Similarly, the administrative console 64 may interface with the hypervisor 54 of computer 108 or 102 to add a new logical partition, load software on the new logical partition, and configure that new logical partition as a member 112 of the distributed computing environment 100. These three examples are not intended to be limiting, and merely illustrate three possible operations among the many that may be performed by the administrative console 64.

Figure 4:
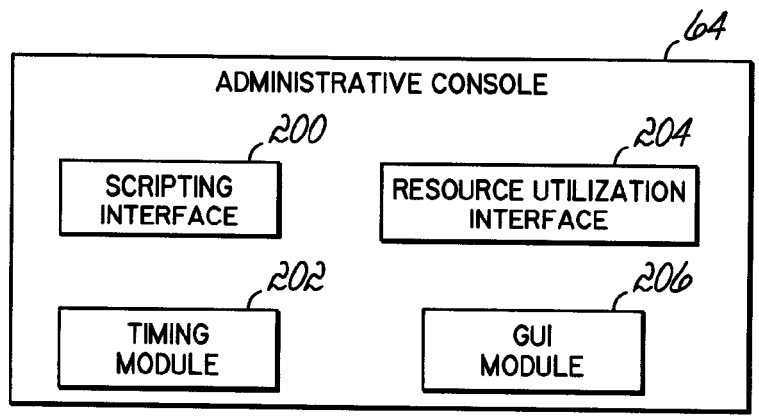
FIG. 4 is a diagrammatic illustration of the primary software components of the administrative console shown in FIGS. 2 and 3.

FIG. 4 illustrates in greater detail the primary components used to implement the administrative console 64 consistent with embodiments of the invention. The administrative console 64 is operable to receive requests to adjust the resources of at least one logically partitioned computing system (i.e., a logically partitioned computing system upon which the administrative console 64 is configured or a DCE computer). The administrative console 64 is also operable to view the resource allocation of the at least one logically partitioned computing system. When there is more than one logically partitioned computing system, as may be the case with a distributed computing environment, the administrative console 64 is operative to view the resource allocation of each logically partitioned computing system singularly or in a combined manner (i.e., view the resources of a DCE computer, or the distributed computing environment as a whole). The administrative console 64 may include a scripting interface 200 to provide the user an interface to create business rules associated with the allocation of resources in the at least one logically partitioned computing system. These business rules may be acted upon immediately by the administrative console, or they may be conditioned upon the occurrence of an event, status, or other condition. In one embodiment, the user may enter the command "Add Local Server" that is operable to cause the administrative console 64 to interface with the hypervisor 54 on the logically partitioned computing system on which it is configured to create a new logical partition and load it with server software. In alternate embodiments, the user may enter the command "Add Remote Server" that is operable to cause the administrative console 64 to interface with an HMC 63 on logically partitioned computing system in the same distributed computing system as the administrative console 64 to create a new logical partition and load it with server software.

The administrative console 64 may also include a timing module 202. The timing module 202 is operative to track the date and time, as well as interface with the scripting interface 200. In this way, the operator may use the scripting interface 200 and input a condition to the administrative console 64 that adjusts the resources of the at least one logically partitioned computing system at a particular time. For example, the user may enter a command in the scripting interface 200 to "Add Server at 12:00 a.m. EST" that is operable to cause the administrative console 64 to interface with an hypervisor 54 to create a new logical partition and load it with server software at 12:00 a.m. EST. The new server may be configured on the same logically partitioned computer as the administrative console 64, or a DCE computer. As another example, the user may enter a command in the scripting interface 200 to "Allocate free resources on DCE Computer 2 to Logical Partition 2 from 8:00 a.m. EST to 5:00 p.m. EST" that is operable to cause the administrative console 64 to interface with a hypervisor 54 on a particular DCE computer and allocate all free resources on the particular DCE computer to the particular logical partition from 8:00 a.m. EST to 5:00 p.m. EST. In this way, the administrative console 64 can be programmed in a number of ways to achieve useful and desired results.

The administrative console 64 may further include a resource utilization interface 204 that interfaces with the hypervisor 54 to determine resource utilization. Furthermore, the resource utilization interface 204 may be configured to determine the priority of the resources, or the priority of the logical partitions configured on logically partitioned computing systems. For example, the resource utilization interface 204 may determine that a particular logical partition has a low priority because it is not using all the allocated resources or because it has been configured for the longest time. In an alternate embodiment, the user may input the priority of resources of the computer 10, logical partitions 40, 42, 44, and/or members of the distributed computing environment into the administrative console 64 manually.

The administrative console 64 includes a GUI module 206 to receive input from, and otherwise interact with, the user. The GUI module 206 may display the configuration of the at least one logically partitioned computer, display the resource usage of the at least one logically partitioned computer, receive input that specifies the priority of the logical partitions of the at least one logically partitioned computer, and/or receive input to change the resource allocation of the at least one logically partitioned computer. For example, in one embodiment, the GUI module 206 provides the user with a graphical representation of all the resources in the distributed computing environment, including those that are allocated to the logical partitions of the DCE computers and those that are maintained in resource pools 59 of the DCE computers. The user may interface with the administrative console 64 to "drag and drop" the resources from the graphical representation of the resource pool 59 to the graphical representations of the logical partitions, or to a new logical partition, to change the resource allocation of the distributed computing environment. In this embodiment, the administrative console 64 interacts with one or more hypervisors 64 on one or more DCE computers to adjust the resources accordingly. Similarly, by selecting a graphical representation of a logical partition or resources allocated to a logical partition, then removing the logical partition or resources, the administrative console 64 interacts with a hypervisor 64 to remove that logical partition or those resources, respectively.

The GUI module 206 may provide buttons that a user can select to change the resource allocation of the at least one logically partitioned computer. For example, the buttons may be configurable through the scripting interface 200 such that by clicking on the representation of a button a new logical partition is created, the new logical partition is allocated free resources, and software is loaded on the new logical partition. Similarly, a button may be provided by the GUI module 206 to delete one or more logical partitions. The number of buttons may be configured by the user, and the buttons themselves may be configured to perform any function of the administrative console 64.

The administrative console 64 may be used by the operator to create and/or terminate logical partitions, migrate resources to and from logical partitions through a "drag and drop" interface or other controls, receive business rules for automatic migration of resources to or from logical partitions, track times, and/or view utilization statistics and metrics of the logically partitioned computing system and/or DCE computers. For example, and not intending to be limiting, the business rules may be that a specific logical partition is allocated all free resources in a logically partitioned computing system during business hours. Also for example, the operator may define a business rule that automatically migrates resources to one or more logical partitions (new or pre-existing) for special processing of data, to ensure high availability, for capacity requirements, or for any other reason. The scripting interface 200 allows the operator to specify the addition or removal of resources from logical partitions, the creation of new logical partitions, the data to load on new logical partitions, and/or the migration of resources from one or more logical partitions to one or more other logical partitions. The timing module 202 allows the administrative console 64 to be responsive to business rules that specify conditions for particular times to adjust the allocation of resources, while the resource utilization interface 204 allows the administrative console 64 to be responsive to business rules that specify particular resource conditions to adjust the allocation of resources. As such, when the user utilizes the scripting interface 200 or manipulates the representations provided by the GUI module 206, the administrative console 64 may determine if the condition has occurred and/or perform the action specified by the user. In this way, the administrative console 64 may react automatically to changed conditions or in response to user commands.

It will be appreciated that the illustration of components and resources in FIGS. 1-4 are merely exemplary in nature, and that any combination and/or arrangement of components and/or resources may be allocated to any logical partition in the alternative. For instance, it will be appreciated that resources may also be represented in terms of the input/output processors used to interface the computer 10 with the specific hardware devices.

The various components and resources illustrated in FIGS. 1-4 may be implemented in a number of manners, including using various computer software applications, routines, components, programs, objects, modules, data structures, etc., referred to hereinafter as "program code." Program code typically comprises one or more instructions that are resident at various times in various memory and storage devices in the computer, and that, when read and executed by at least one processor in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of computer readable medium used to actually carry out the distribution. Examples of computer readable media include, but are not limited to tangible, recordable type media such as volatile and non-volatile memory devices, floppy and other removable disks, hard disk drives, electronic memory (including USB memory drives), magnetic tape, optical disks (e.g., CD-ROM's, DVD's, HD-DVD's, Blu-Ray Discs, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIGS. 1-4 is not intended to limit the present invention. Though not shown in FIG. 2, for instance, one skilled in the art will appreciate that other partitions may be included within other embodiments of the computer 10, including a partition that comprises part of the hypervisor 54. While multiple processors 12 are shown in FIGS. 1 and 2, one skilled in the art will appreciate that more or fewer processors 12 may be implemented. Additionally, while three partitions 40, 42, 44 are shown in FIG. 2, one skilled in the art will appreciate that more or fewer partitions may be implemented.

While one embodiment of the distributed computing environment 100 is illustrated in FIG. 3, one having ordinary skill in the art will appreciate that more or fewer logically partitioned computing systems and more or fewer logical partitions may be configured within the distributed computing environment. Furthermore, while one embodiment of the administrative console 64 is illustrated in FIG. 4, one skilled in the art will appreciate that more software modules, controls, or components may be included without departing from the scope of the invention. As such, the functionality, and combinations of functionality, of the administrative console 64 are not intended to be limiting, other functionality will be apparent to one skilled in the art without departing from the scope of the invention. Therefore, other alternative hardware and/or software environments may be used without departing from the scope of the invention.

Adjusting Resources with the Administrative Console

Figure 5:
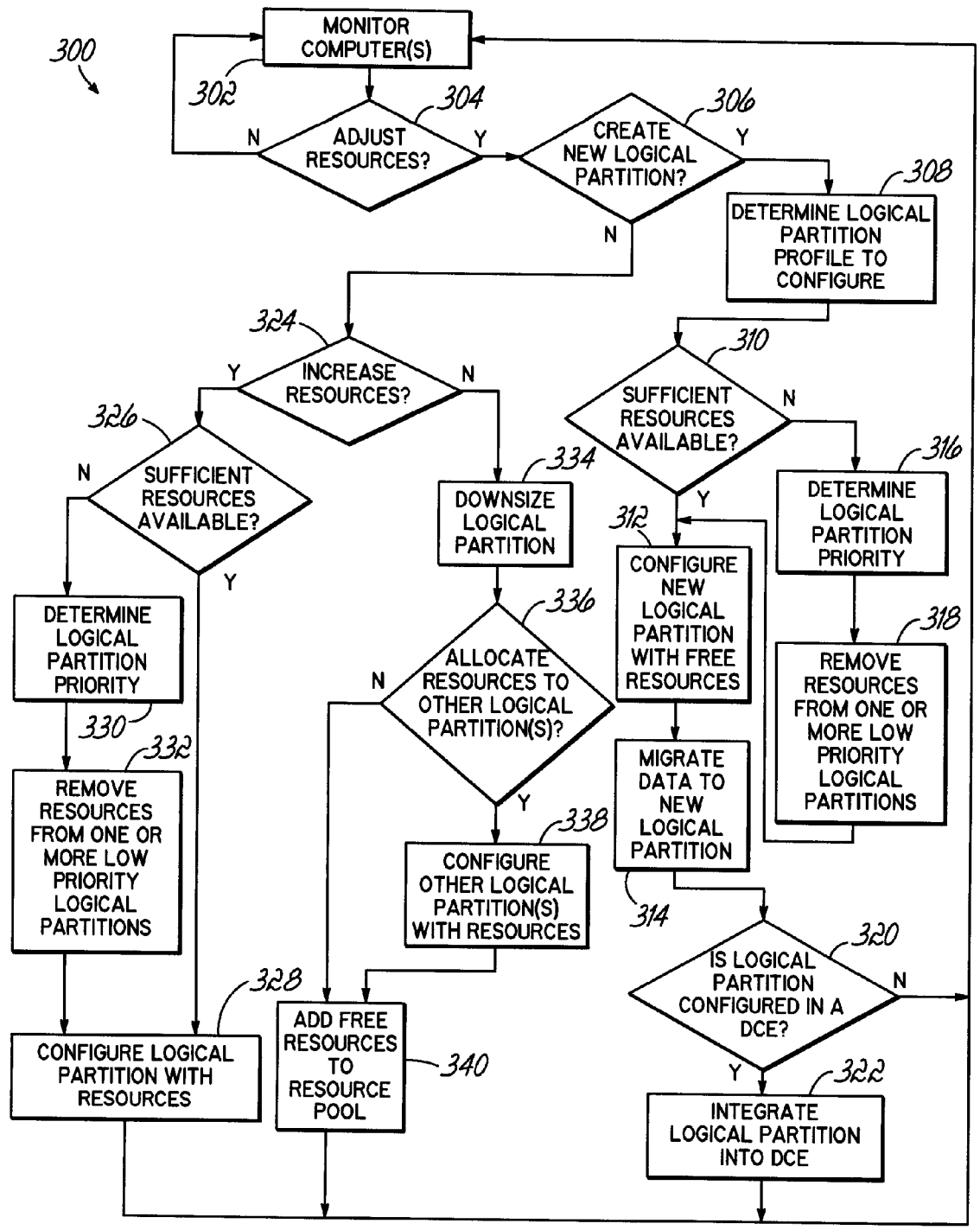
FIG. 5 is a flowchart having steps executable to accomplish dynamic local logical partition adjustment and retain data processing capabilities consistent with embodiments of the invention in the computers of FIGS. 1 and 2 and/or the distributed computing environment of FIG. 3.

FIG. 5 illustrates a flowchart 300 having steps executable by the administrative console 64 of FIGS. 2-4 to manage the plurality of resources of at least one logically partitioned computing system consistent with the invention. Referring back to FIG. 5, the program code monitors the at least one logically partitioned computing system (which may be a "local" logically partitioned computing system configured with a logical partition upon which the administrative console 64 is configured, or a "remote" logically partitioned computing system that includes at least one logical partition configured as a member of the same distributed computing environment as the logical partition upon which the administrative console 64 is configured) to determine whether to adjust resources of the at least one logically partitioned computing system in block 302. In block 302, the program code may monitor the resource utilization interface 204 to determine if a business rule has been triggered. The program code may also monitor the timing module 202 to determine if a time has been reached to adjust resources. Furthermore, the program code monitors the scripting interface 200, the GUI module 206, and network 26 to receive user requests to adjust resources in block 302. The user request may include a request to adjust the allocation of at least a portion of the resources of the at least one logically partitioned computing system. In block 304, the program code determines if the resources the at least one logically partitioned computing system should be adjusted. When the program code determines that there is no adjustment required, it continues monitoring in block 302.

When the program code receives a request to adjust resources, the program code determines whether to create a new logical partition in block 306. The program code may determine the need for the new logical partition in response to increased demand for the resources of the at least one logically partitioned computing system, increased demand on the logical partitions or operating systems of the at least one logically partitioned computing system, increased connections to the at least one logically partitioned computing system, and/or determining that the request specifies the creation of the new logical partition. One skilled in the art will realize that the foregoing list is merely exemplary, and the program code may determine that a new logical partition should be created for any number of reasons, conditions, factors, or business rules.

When the creation of a new logical partition is appropriate, the program code determines a logical partition profile to configure on the new logical partition in block 308. In one embodiment the logical partition profile includes data associated with a logical partition. This data may include an operating system, the applications, and/or other data to load onto the new logical partition such as configuration data, resource utilization data, and input/output data for the logical partition. The logical partition profile may also be associated with default resources to assign to the new logical partition. The logical partition profile may be stored on a logically partitioned computing system configured with the administrative console 64 or stored across the network 26. In one embodiment, the program code may automatically choose the logical partition profile in block 308. In alternate embodiments, the logical partition profile is chosen by the operator or specified in the user request.

In block 310, the program code analyzes the at least one logically partitioned computing system and determines whether there are sufficient resources available in a resource pool 59 of that at least one logically partitioned computing system to configure the new logical partition. When the program code determines there are sufficient resources in the resource pool 59, the new logical partition is configured on the at least one logically partitioned computing system in block 312. In block 312, the program code allocates free resources to the new logical partition. In one embodiment, the program code interfaces with the hypervisor 54 of the at least one logically partitioned computing system and adjusts the resource pool 59, dispatcher 60, ready queue 61, and control blocks 62 to assign resources to the new logical partition sufficient to satisfy the request.

In block 314, the program code also migrates data from the logical partition profile to the new logical partition. Once the new logical partition has been loaded and configured, the new logical partition is started in block 314.

Returning to block 310, when there are insufficient resources in the resource pool 59 to configure the new logical partition the program code determines the priority of each logical partition on the at least one logically partitioned computing system in block 316. In some embodiments, the program code determines the priority of logical partitions automatically in block 316. The program code may automatically determine the priority of the logical partitions by determining which logical partition has been configured the longest or by determining which logical partition is not utilizing all its allocated resources. In an alternate embodiment, the operator may specify the priority of each logical partition on the at least one logically partitioned computing system through the GUI module 206.

In block 318, the program code removes resources from one or more low priority partitions of the at least one logically partitioned computing system. In one embodiment, the program code interfaces with the hypervisor 54 of the at least one logically partitioned computing device and adjusts the dispatcher 60, ready queue 61, and control blocks 62 to remove some or all of the resources from one or more logical partitions with a low priority. The program code may remove resources from the one or more low priority logical partitions such that the resources removed, along with the free resources in the resource pool 59, are sufficient to satisfy the request and configure the new logical partition. These removed resources (i.e., free resources) are maintained in the free resource pool 59. In block 312, the program code configures the new logical partition with sufficient free resources from the resource pool 59 to satisfy the request. The program code proceeds to block 314 to migrate the logical partition profile to the new logical partition and then start the new logical partition.

In block 320, the program code determines whether the new logical partition is configured as a member of a DCE. The program code integrates the new logical partition into the DCE in block 322 when it determines that the new logical partition is configured in the DCE. After the new logical partition is integrated into the DCE in block 322, or when the program code determines that the new logical partition is not configured in a DCE in block 320, the program code continues to monitor the at least one logically partitioned computing device in block 302.

Referring back to block 306, when the program code determines that a new logical partition should not be created, the program code determines whether to increase the resources allocated to at least one logical partition in block 324. When the program code determines that the resources of the at least one logical partition should be increased, the program code determines if there are sufficient resources available in the resource pool 59 in block 326.

In block 326, the program code determines whether the increased resources requested for the at least one logical partition are available in the resource pool 59 of the at least one logically partitioned computing device. The program code allocates resources to the at least one logical partition sufficient to satisfy the request when there are sufficient resources available in the resource pool 59 in block 328. In one embodiment, the program code interfaces with the hypervisor 54 of the at least one logically partitioned computing device and adjusts the resource pool 59, dispatcher 60, ready queue 61, and control blocks 62 to assign the free resources to the at least one logical partition.

Referring back to block 326, when the program code determines that there are not enough resources in the resource pool 59 available to add to the at least one logical partition to satisfy the request, the program code determines logical partition priority of the at least one logically partitioned computing device in block 330. In some embodiments, the program code determines the priority of logical partitions automatically in block 330. The program code may automatically determine the priority of the logical partitions by determining which logical partition has been configured the longest or by determining which logical partition is not utilizing all its allocated resources. In an alternate embodiment, the operator may specify the priority of each logical partition through the GUI module 206.

In block 332, the program removes resources from one or more low priority partitions. In one embodiment, the program code interfaces with the hypervisor 54 of the at least one logically partitioned computing device and adjusts the dispatcher 60, ready queue 61, and control blocks 62 to remove resources from one or more logical partitions with a low priority. The program code may remove resources from one or more low priority logical partitions such that the resources removed, along with the free resources in the resource pool 59, are sufficient to satisfy the request for additional resources to the at least one logical partition. The removed resources are maintained in the resource pool 59. In block 328, the program code configures the at least one logical partition with the free resources in the resource pool 59 sufficient to satisfy the request, then proceeds back to block 302 to monitor the at least one logically partitioned computing device.

Referring back to block 324, when the program code determines that the resources of the logical partition 40 should be decreased, the at least one logical partition is downsized in block 334. In one embodiment, the program code interfaces with the hypervisor 54 of the at least one logically partitioned computing device and adjusts the dispatcher 60, ready queue 61, and control blocks 62 to remove resources from the at least one logical partition. The removed resources are maintained in the resource pool 59.

In block 336, the program code determines whether to allocate resources to other logical partitions configured on the at least one logically partitioned computing device. When the program code determines that it should allocate resources to one or more of the other logical partitions, it configures one or more of the other logical partitions with free resources in block 338. In block 338, the program code may allocate resources to the one or more of the other logical partitions automatically or in response to a user request. For example, and not intending to be limiting, the program code may remove resources from logical partition 40 and allocate free resources exclusively to a logical partition 42, 44 based on need and/or in response to a user request. In alternate embodiments, the program code may allocate free resources to the other logical partitions 42 and 44 by sharing the free resources equally among the logical partitions 42 and 44 in a manner well known in the art.

In block 340, free resources that remain unallocated are maintained in the free resource pool. The program code continues to monitor the at least one logically partitioned computing device in block 302.

While the present invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. In particular, the invention in its broader aspects may include more or fewer administrative consoles 64, DCE computers, logical partitions in each DCE computer, or logical partitions in computer 10. Accordingly, departures may be made from such details without departing from the spirit or scope of applicants' general inventive concept.

What is claimed is:

1. A method of managing a plurality of resources of a logically partitioned computing system of the type that includes a plurality of logical partitions managed by a partition manager, wherein each logical partition is allocated at least a portion of the plurality of resources and has an operating system resident therein, the method comprising:
   maintaining resources that are not allocated to the plurality of logical partitions in a resource pool;
   receiving a user request to adjust the allocation of at least a portion of the plurality of resources using an application level administrative console that is resident within a logical partition in the logically partitioned computing system, that is disposed in an application level above that of an operating system resident in such logical partition, and that includes an interface with a user;
   determining resources of the logically partitioned computing system to adjust in order to satisfy the user request using the application level administrative console; and
   utilizing the application level administrative console to access the partition manager through a resource allocation interface for the partition manager to adjust the determined resources of the logically partitioned computing system in order to satisfy the user request, wherein the user request is for the creation of a new logical partition and utilizing the application level administrative console further comprises:
      identifying a logical partition profile to configure on the new logical partition;
      allocating at least a portion of the resources in the resource pool to the new logical partition; and
      migrating data from the logical partition profile to the new logical partition.

2. The method of claim 1, wherein utilizing the application level administrative console further comprises:
   configuring the new logical partition as a member of a distributed computing environment.

3. The method of claim 1, wherein utilizing the application level administrative console further comprises:
   allocating at least a portion of the resources from the resource pool to at least one logical partition.

4. The method of claim 1, wherein utilizing the application level administrative console further comprises:
   removing a subset of the at least a portion of the resources allocated to at least one logical partition.

5. The method of claim 4, wherein the user request is for the creation of a new logical partition and utilizing the application level administrative console further comprises:
   identifying a logical partition profile to configure on the new logical partition;
   allocating the subset of the at least a portion of the resources to the new logical partition;
   migrating data from the logical partition profile to the new logical partition; and
   configuring the new logical partition as a member of a distributed computing environment.

6. The method of claim 5, further comprising:
   allocating at least a portion of the resources in the resource pool to the new logical partition.

7. The method of claim 1, wherein the logical partition the application level administrative console is resident in is configured as a member of a distributed computing environment.

8. The method of claim 7, the method further comprising:
   accessing the partition manager with the application level administrative console to determine the resource utilization of the logical partition the application level administrative console is resident in; and
   displaying the resource utilization of the distributed computing environment.

9. A method of managing a first plurality of resources of a first logically partitioned computing system of the type that includes a first plurality of logical partitions managed by a first partition manager, wherein each logical partition of the first plurality of logical partitions is allocated at least a portion of the first plurality of resources, and wherein at least one logical partition of the first plurality of logical partitions is configured as a member of a distributed computing environment, the method comprising:
   maintaining resources that are not allocated to the first plurality of logical partitions in a resource pool;
   receiving a user request with an application level administrative console resident in a logical partition on a second logically partitioned computer of the type that includes a second plurality of logical partitions managed by a second partition manager, wherein each of the second plurality of logical partitions has an operating system resident therein, wherein the application level administrative console is disposed in an application level above that of an operating system resident in such logical partition and includes an interface with a user, wherein the second logically partitioned computer includes a second plurality of resources, wherein each logical partition of the second plurality of logical partitions is allocated at least a portion of the second plurality of resources, wherein at least one logical partition of the second plurality of logical partitions is configured as a member of the distributed computing environment, wherein the first and second logically partitioned computing systems communicate with each other over a network, wherein the application level administrative console is disposed in a middleware application configured to manage the distributed computing environment, and wherein the user request includes a request to adjust the allocation of a least a portion of the first plurality of resources;
   determining the resources of the first logically partitioned computing system to adjust in order to satisfy the request using the application level administrative console; and utilizing the application level administrative console to access the first partition manager through a resource allocation interface for the first partition manager to adjust the determined resources of the first logically partitioned computing system, wherein the user request is for the creation of a new logical partition and utilizing the application level administrative console further comprises:

identifying a logical partition profile to configure on the new logical partition;

allocating at least a portion of the resources in the resource pool to the new logical partition; and migrating data from the logical partition profile to the new logical partition.

10. The method of claim 9, further comprising:

accessing the first partition manager on the first logically partitioned computing system with the application level administrative console to determine the resource utilization of the at least one logical partition of the first plurality of logical partitions configured as the member of the distributed computing environment;

accessing the second partition manager on the second logically partitioned computing system with the application level administrative console to determine the resource utilization of the at least one logical partition of the second plurality of logical partitions configured as the member of the distributed computing environment; and displaying the resource utilization of the distributed computing environment, wherein displaying the resource utilization includes displaying the resource utilization on the first and second logically partitioned computing systems.

11. An apparatus comprising:

at least one physical processor; and program code configured to be executed by the at least one processor to manage a plurality of resources of a logically partitioned computing system that includes a plurality of logical partitions managed by a partition manager, wherein each logical partition is allocated at least a portion of the plurality of resources and has an operating system resident therein, the program code further configured to receive a user request to adjust the allocation of at least a portion of the plurality of resources using an application level administrative console that is resident within a logical partition in the logically partitioned computing system, that is disposed in an application level above that of an operating system resident in such logical partition, and that includes an interface with a user, determine resources of the logically partitioned computing system to adjust in order to satisfy the user request using the application level administrative console, and utilize the application level administrative console to access the partition manager through a resource allocation interface for the partition manager to adjust the determined resources of the logically partitioned computing system in order to satisfy the user request, wherein the program code is further configured to maintain resources that are not allocated to the plurality of logical partitions in a resource pool, wherein the user request is for the creation of a new logical partition and wherein the program code is further configured to identify a logical partition profile to configure on the new logical partition, allocate at least a portion of the resources in the resource pool to the new logical partition, and migrate data from the logical partition profile to the new logical partition.

12. The apparatus of claim 11, wherein the program code is further configured to configure the new logical partition as a member of a distributed computing environment.

13. The apparatus of claim 11, wherein the program code is further configured to allocate at least a portion of the resources from the resource pool to at least one logical partition.

14. The apparatus of claim 11, wherein the program code is further configured to remove a subset of the at least a portion of the resources allocated to at least one logical partition.

15. The apparatus of claim 14, wherein the user request is for the creation of a new logical partition and the program code is further configured to identify a logical partition profile to configure on the new logical partition, allocate the subset of the at least a portion of the resources to the new logical partition, migrate data from the logical partition profile to the new logical partition, and configure the new logical partition as a member of a distributed computing environment.

16. The apparatus of claim 15, the program code further configured to allocate at least a portion of the resources in the resource pool to the new logical partition.

17. The apparatus of claim 11, wherein the logical partition the application level administrative console is resident in is configured as a member of a distributed computing environment.

18. The apparatus of claim 17, the program code further configured to access the partition manager with the application level administrative console to determine the resource utilization of the logical partition the application level administrative console is resident in, and display the resource utilization of the distributed computing environment.

19. A program product, comprising:

a recordable computer readable medium; and program code stored on the recordable computer readable medium and configured to be executed by at least one processor to manage a plurality of resources of a logically partitioned computing system that includes a plurality of logical partitions managed by a partition manager, wherein each logical partition is allocated at least a portion of the plurality of resources and has an operating system resident therein, the program code further configured to receive a user request to adjust the allocation of at least a portion of the plurality of resources using an application level administrative console that is resident within a logical partition in the logically partitioned computing system, that is disposed in an application level above that of an operating system resident in such logical partition, and that includes an interface with a user, determine resources of the logically partitioned computing system to adjust in order to satisfy the user request using the application level administrative console, and utilize the application level administrative console to access the partition manager through a resource allocation interface for the partition manager to adjust the determined resources of the logically partitioned computing system in order to satisfy the user request, wherein the program code is further configured to maintain resources that are not allocated to the plurality of logical partitions in a resource pool, wherein the user request is for the creation of a new logical partition and wherein the program code is further configured to identify a logical partition profile to configure on the new logical partition, allocate at least a portion of the resources in the resource pool to the new logical partition, and migrate data from the logical partition profile to the new logical partition.

* * * * *